United States Patent [19]

Doyle et al.

[11] Patent Number: 4,836,628

[45] Date of Patent: Jun. 6, 1989

[54] HOLOGRAPHIC FILM MATERIAL

[75] Inventors: James Doyle, Wilmslow; Anthony J. Bond, Leigh; Fiona E. Davidson, Henbury, all of England

[73] Assignee: Ciba-Geigy AG, Basel, Switzerland

[21] Appl. No.: 35,024

[22] Filed: Apr. 6, 1987

[30] Foreign Application Priority Data

Apr. 4, 1986 [GB] United Kingdom ................. 8608278

[51] Int. Cl.[4] ................................................ G03H 1/04

[52] U.S. Cl. ........................................ 350/3.61; 430/1; 430/2

[58] Field of Search ...................... 350/3.61; 430/1, 2, 430/513, 516, 568

[56] References Cited

U.S. PATENT DOCUMENTS

| | | | |
|---|---|---|---|
| 3,776,727 | 12/1973 | Nassenstein et al. | 96/27 H |
| 3,963,490 | 6/1976 | Graube | 430/2 |
| 3,971,664 | 7/1976 | Nakazawa et al. | 430/2 |
| 4,032,348 | 6/1977 | Kido et al. | 430/1 |
| 4,168,977 | 9/1979 | Takada et al. | 430/568 |
| 4,210,715 | 7/1980 | Fujiwhara et al. | 430/568 |
| 4,413,055 | 11/1983 | Weyde et al. | 430/567 |
| 4,450,225 | 5/1984 | Weyde et al. | 430/568 |
| 4,517,266 | 5/1985 | Ikegami et al. | 430/1 |
| 4,656,106 | 4/1987 | Holland et al. | 430/1 |
| 4,685,768 | 8/1987 | Blyth | 430/1 |

OTHER PUBLICATIONS

Phillips et al., Photographic Science and Engineering, vol. 24, No. 2, pp. 120-124 (1980).

*Primary Examiner*—Rodney B. Bovernick
*Assistant Examiner*—Martin Lerner
*Attorney, Agent, or Firm*—Wenderoth, Lind & Ponack

[57] ABSTRACT

Holographic film material which comprises in a silver halide emulsion layer an amount of a water-soluble compound, which does not affect the photographic properties of the silver halide emulsion and which is non-light scattering.

9 Claims, No Drawings

HOLOGRAPHIC FILM MATERIAL

The present invention relates to holographic film material. Holograms can be made using very fine grain silver halide sensitised photographic material by subjecting the material to a holographic exposure using a laser to produce an object beam and a reference beam which interfere to produce a series of intereference finges which may be fixed in the material by a photographic developing step. These fringes may be used to reconstruct a hologram using either coherent or incoherent light depending on the exposure conditions employed.

Amplitude holograms are obtained when the developed silver is left in the photographic material and is used to reconstruct the holographic image. However, brighter holograms may be obtained when the developed silver is removed from material or converted back to silver halide and redistributed. In these cases silver halide is used to reconstruct the holographic image. A hologram which has been produced by these methods is called a phase hologram.

Many holograms and especially phase reflection holograms are used for display purposes and such holograms are required to be as bright as possible. Bright holograms are those which have low scatter and have a high diffraction efficiency.

Bright holograms can be obtained when the silver halide employed in the material is of very small crystal size and the method of processing involves the use of a solvent bleach which removes both the imagewise developed silver and any non-imagewise developed silver (fog).

However an even brighter hologram may be obtained using a rehalogenating bleach treatment. In this case the developed silver image is bleached to silver halide but instead of being dissolved out of the material it is redistributed within the recording layer.

In general a hologram will replay, using white light reconstruction, at about the wavelength of the coherent light which was used in the exposure to prepare it. However, during the chemical processing of silver halide sensitised holographic material there is usually some shrinkage of the gelatin binder and this causes, in reflection holograms, the replay wavelength to be shorter than the wavelength of the laser using in the exposure of the material. This is particularly true when a solvent bleach system is used to remove the developed silver. However when a rehalogenating bleach is used to redistribute the developed silver the replay wavelength on replay is not much shorter than the wavelength of the exposing coherent light.

It is very common to use pulsed ruby lasers which emit at 694 nm and the He-Ne lasers which emit at 633 nm. Thus holograms made using these lasers to expose the material and using a rehalogenating bleach to process the material after exposure would replay at about 694 nm and 633 nm respectively. This produces a hologram which does not appear very bright as the human eye is 100 times sensitive at 694 nm than it is at 560–570 nm.

Therefore, it is the object of the present invention to provide holographic film material which can be exposed using a pulsed ruby or He:Ne laser, processed using a rehalogenating bleach system but which yield a hologram which replays in white light below 600 nm and preferably in the range of 560–570 nm.

Thus according to the present invention there is provided holographic film material which comprises coated on a light transparent base at least one light-sensitive gelatino silver halide emulsion layer the silver halide grains of which have been sensitised to red light and which have a median grain size of less than 0.1 μm, there being present in the emulsion layer from 0.1 to 1.0 g of a water-soluble compound per gram of silver present in the emulsion, the water-soluble compound being a compound which does not affect the photographic properties of the silver halide emulsion and which is non-light scattering. When the photographic material of the present invention is exposed to produce a reflection hologram and processed using an aqueous silver halide developer bath, and an aqueous silver bleaching bath, substantially all the water-soluble compound is removed from the emulsion layer. This has the effect of causing the interference fringes to lie closer together. This means that the replay wavelength of the resultant reflection hologram in white light is reduced compared with material containing the same silver halide emulsion exposed and processed similarly but which does not contain any appreciable amount of water-soluble compound in the emulsion. The actual decrease in the replay wavelength depends primarily on the amount of water soluble material which was present initially in the material.

Preferably the water soluble compound yields a colourless aqueous solution which dissolves in water and is soluble to the extent of at least 3 g/liter of water and more preferably to the extent of at least 20 g/liter of water.

Preferably the water soluble compound is an organic compound but inorganic compounds for example salts can be used but their use can cause trouble as they tend to crystalise out in the emulsion and thus alter the physical and optical characteristics of the emulsion.

Examples of water-soluble organic compounds which can be used in the holographic material of the present emulsion include the following classes of compounds:

(a) saturated and unsaturated mono- and dicarboxylic acid amides, particularly those of formula $$R{-}CO{-}NH_2 \text{ or } R{-}(CONH_2)_2$$

wherein R represents a monovalent or divalent alkyl or alkylene radical having 1–6 carbon atoms, or the group $-CH{=}CH-$, $CH_2{=}CH-$, $CH_3CH{=}CH-$, also phenyl, phenylene, tolyl or tolylene also a heterocyclic monovalent or divalent saturated and/or unsaturated 5- or 6-membered ring having at least on N, O, S, CO or NH in the ring, whereby the symbol R can optionally be substituted also by OH, $NH_2$ halogen or hydroxyalkyl having 1–3 carbon atoms. Useful acid amides are, for example, acetamide, chloroacetamide, nicotinic acid amide and benzamide;

(b) lactams such as d-valerolactam, ε-caprolactam and oenantholactam;

(c) acid imides or derivatives of acid imides, especially those of the general formula;

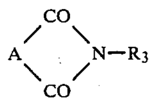

wherein A represents —CH=CH— or $(CH_2)_n$, wherein n is 1–6, and A can optionally be substituted by OH, $NH_2$ halogen, hydroxyalkyl ($C_1$–$C_3$) gorups, and $R_3$ represents H, OH or hydroxyalkyl ($C_1$–$C_3$), examples of these are: succinimide, maleinimide and N-hydroxysuccinimide;

(d) oximes such as acetoneoxime, cyclohexanoneoxime and diacetylmonoxime;

(e) aliphatic or aromatic, at lest bivalent alcohols, such as 2,2-dimethyl- and 2,2-diethylpropanediol-1,3; dihydroxyacetone, o-xylylene glycol, erythrite, D-fructose, sucrose, lactose, maltose, xylite, sorbitol and mannitol; also hydroquinone although it will exhibit development activity, (f) polyalkylene glycols which are photographically inert, such as polyethylene glycol preferably having a molecular weight of 1,000 to 20,000, especially those of the formula

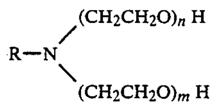

wherein R represents a saturated or unsaturated alkyl radical having 9 to 30 carbon atoms, and n and m each represents the numbers 3 to 200; and also some wetting agents such as wetting agents based on ethylene or propylene oxides such as alkylphenoxypoly (hydroxypropylene) oxides can be used.

(g) carbamic acid esters, such as carbamic acid methyl ester, carbamic acid ethyl ester, and carbamic acid propyl ester.

The preferred classes of compound for use in the present invention are the aliphatic at-least-bivalent alcohols of (e). Especially preferred compounds are sorbitol which has a water solubility of 830 g/liter at 20° C., sucrose which has a water solubility of 2,500 g/liter at 20° C. and lactose which has a water solubility of 170 g/liter at 20° C.

Certain water-soluble compounds such as urea which are silver halide solvents can not be used as they destroy the holographic image. Most water soluble polymers can not be used as they cause light-scattering and this prevents the holographic image from being viewed.

Most silver halide emulsions contain some wetting agents to aid coating and when these wetting agents are leached out of the holographic material during processing some decrease in replay wavelength is observed. However the use of wetting agents as the water-soluble compound is not recommended as emulsions which contain fairly large amounts of wetting agents are difficult to coat.

The greatest use of the holographic material of the present invention is seen when a halogenating bleach system is used in the processing to produce the hologram. However as previously mentioned there is some decrease in replay wavelength when a solvent bleach system is used to process the holographic material. Further this decrease is dependent on the length of processing time and on the exposure thus it is diffucult to predict the actual decrease in replay wavelength when using a solvent bleach system.

Nearly all holographic materials based on silver halide emulsions contain a small amount of water-soluble substances such as wetting agents and stabilisers thus as such substances are dissolved during processing decreases in replay wavelength are usually observed even when using a rehalogenating bleach system. This is shown in the control material used in the Examples which follow.

Changes in the hardness of gelatin layer affect the replay wavelength only marginally, usually less than 5 nm.

Preferably the silver halide used in the silver halide emulsion is predominantly silver bromide.

The usual processing sequence is silver halide development using a silver halide developing agent for example hydroquinone, followed by a silver bleaching process.

The silver bleaching step may be any process of removing the developed silver, but which leaves the unexposed silver halide in situ. It is to be understood that the developed silver may be converted to silver halide some of which may remain in the holographic material. When a rehalogenating bleach is used in fact, a high proportion of the developed silver is converted to silver halide which then deposits on the unexposed silver halide in the material and thus helps to achieve a brighter hologram by increasing the modulation of the reconstructing light.

Any of the known red sensitising dyes can be used to sensitise the silver halide grains to red light. Preferably if a He:Ne laser is to be used for the exposure a dye is chosen which exerts its maximum sensitising effect at between 620 and 650 nm and is a pulsed ruby laser is to be used a sensitizing dye which exerts its maximum sensitising effect at between 680 and 710 is chosen.

Because the control holographic material used in the examples which follow, i.e. material which contains no added water-soluble exhibits some decrease in replay the results obtained when adding a water-soluble compound are given as the difference in replay wavelength between the control material and the test material with added water soluble compound after processing rather than between the wavelength of the exposing laser and the test material even though in most cases a rehalogenating bleach system is used.

The following examples will serve to illustrate the invention.

EXAMPLE 1

A sample of control holographic material was prepared by coating on to a transparent photographic film base a gelatino halide emulsion which was substantially pure silver bromide having a mean crystal size of 0.04 microns at a silver coating weight of 3.0 g/m$^2$ with a gelatin coating weight of 4.5 g/m$^2$. The silver halide crystals were sensitized with a red sensitising dye so that they were optimally sensitive to 633 nm and emission wavelength of a He:Ne laser. A gelatin supercoat of 1.1 g/m$^2$ was coated on the silver halide layer.

Further sets of test halographic materials were produced using the same silver halide emulsion two containing sorbitol and two containing sucrose. In all cases the requisite amount of water-soluble compound was dissolved to form a concentrated aqueous solution and this solution was mixed into the aqueous silver halide emulsion before it was coated on the base:

Test 1 contained 0.154 g sorbitol per gram of silver
Test 2 contained 0.308 g sorbitol per gram of silver
Test 3 contained 0.154 g sucrose per gram of silver
Test 4 contained 0.308 g sucrose per gram of silver The control and the four tests were holographically exposed using a 5 mW He:Ne laser by a Denisyuk exposure method using a brushed aluminum plate as an object to yield (after processing) a reflection hologram.

The processing was carried out as follows:

All the samples were developed for 2 minutes in a solution of the following formulation:

Sodium Sulphite Anydrous 30 g
Hydroquinone 10 g
Sodium Carbonate 60 g
Water to 1000 ml The samples where then transferred to a rehalogenating bleach bath of the following composition:

Fe(NH$_4$)EDTA(1.8M solution) 150 ml
KBr 20 g
Water to 1000 ml until all silver metal had been bleached out which was about 2 minutes.

The samples were then water washed for 2 minutes in running water.

The hologram in each sample was then reconstructed using white light and the replay wavelength of the hologram was determined.

The results are shown in Table 1 below.

TABLE 1

| | λ Replay (nm) | λ Decrease (nm) | % Diffraction Efficiency |
|---|---|---|---|
| Control | 580 | 0 | 47 |
| Test 1 | 553 | 27 | 45 |
| Test 2 | 533 | 47 | 49 |
| Test 3 | 552 | 28 | 46 |
| Test 4 | 520 | 60 | 52 |

These results show that the greater the amount of water-soluble compound present in the holographic material the greater the decrease in replay wavelength. Further they show that it is possible to obtain a replay wavelength, from either a He:Ne or pulsed ruby exposure, in the region 550–570 nm which covers the wavelength of maximum response for the human eye.

Also these results show that the holographic materials which contained the water soluble compounds yield a hologram which has a comparatively high diffraction efficiency and thus exhibits a bright holographic image.

EXAMPLE 2

Six further samples were prepared as in Example 1. Two were control samples, two contained 0.308 g sucross per gram of silver in the emulsion, and two contained 0.308 g of acetamide per gram of silver in the emulsion.

One control sample, one sample containing sucrose and one sample containing acetamide were holographically exposed using a pulsed ruby laser which emits at 694 nm using a brushed aluminum plate as object to yield (after processing) a reflection hologram.

The remaining samples were exposed as in Example 1 to 5 mW He:Ne laser to yield after processing a reflection hologram.

All the samples were then processed as in Example 1 and water washed for 2 minutes in running water.

The hologram in each sample was then reconstructed using white light and the replay wavelength noted. The results are set out in Table 3.

TABLE 3

| Water soluble compound in sample | λ Replay (nm) after 633 nm exposure | λ Replay (nm) after 694 nm exposure |
|---|---|---|
| None | 570 | 625 |
| Sucrose | 510 | 559 |
| Acetamide | 506 | 554 |

This shows the higher the exposure wavelength the higher the replay wavelength but that the % decrease due to the presence of the water-soluble compound in the holographic material is independent of the exposure wavelength.

EXAMPLE 3

A sample of control holographic material was prepared by coating on to a transparent photographic film base a gelatino halide emulsion which was substantially pure silver bromide having a mean crystal size of 0.04 μm at a silver coating weight of 3.0 g/m$^2$ with a gelatin coating weight of 4.5 g/m$^2$. The silver halide crystals were sensitized with a red sensitising dye so that they were optimally sensitive to 694 nm the emission wavelength of a pulsed ruby laser. A gelatin supercoat of 1.1 g/m$^2$ was coated on the silver halide layer.

There was present in the silver halide emulsion as coated 0.04 g of an alkylphenoxypoly (hydroxypropylene) oxide as coating aid per 1 g of silver.

Two further samples of test holographic materials were produced using the same silver halide emulsion but to one emulsion there was added a further 0.125 g per 1 g of silver of alkylphenoxypoly (hydroxypropylene) oxide (Emulsion A). This emulsion was just coatable. To the other emulsion (Emulsion B) there was added also 0.125 g per 1 g of silver of alkylphenoxypoly (hydroxypropylene) oxide and 0.090 g per 1 g of silver of hydroquinone.

The three samples were holographically exposed by a Denisyuk exposure method using a pulsed ruby laser which emits at 694 nm using a brushed aluminum plate as an object to yield after processing a reflection hologram.

All the samples were then processed as in Example 1 and water washed for 2 minutes in running water.

The hologram in each sample was then reconstructed using white light and the replay wavelength noted. The results are set out in Table 4.

TABLE 4

| Emulsion | λ Replay (nm) |
|---|---|
| Control | 680 |
| emulsion A | 640 |
| emulsion B | 620 |

EXAMPLE 4

This example shows that the holographic material of the present invention can be used with a solvent bleach system but that the results obtained are less predictable and useful.

Two control holographic material samples were prepared as in Example 1 and two further samples were prepared as in Example 1 each containing 0.308 g of sucrose per gram of silver in the silver halide emulsion.

All the samples were exposed and developed as set forth in Example 1. Then one control sample and one sample containing sucrose was subjected to a rehalogenating bleach step as set forth in Example 1. The other two samples were then subjected to a solvent bleach step using a bleach bath of the following compositions:

Potassium dichromate 4 g

Sulphuric acid (conc) 4 g water to 1000 ml until all the silver had bleached which was about 2 minutes.

All four samples were then water washed for 2 minutes in running water. The hologram in each sample was then reconstructed using white light and the replay wavelength noted. The results are set forth in Table 4 below:

TABLE 4

| | rehalogenating bleach | | solvent bleach | |
|---|---|---|---|---|
| | λ replay (nm) | % diffraction efficiency | λ replay (nm) | % diffraction efficiency |
| Control Sample | 590 | 45 | 530 | 24 |
| Sample containing sucrose | 530 | 46 | 475 | 15 |

We claim:

1. Holographic film material which comprises coated on a light transparent base at least one light-sensitive gelatine silver halide emulsion layer the silver halide grains of which have a median grain size of less than 0.1 μm there being present in the emulsion layer from 0.1 to 1.0 g of a water-soluble compound per gram of silver present in the emulsion, the water-soluble compound being a compound which (1) does not afffect the photographic properties of silver halide emulsion, (2) which is non-light scattering and (3) can be leached out from the emulsion layer during processing of the exposed holographic film material.

2. Holographic film material according to claim 1, wherein the light-sensitive gelatino silver halide emulsion has been sensitised to red light.

3. Holographic film material according to claim 1, wherein the water-soluble compound is an organic water-soluble compound.

4. Holographic film material according to claim 1, wherein the water-soluble compound employed yields a colourless aqueous solution which dissolves in water and is soluble to the extent of at least 3 g/liter of water.

5. Holographic film material according to claim 4, wherein the water-soluble compound employed is soluble to the extent of at least 20 g/liter of water.

6. Holographic film material according to claim 1, wherein the water-soluble compound employed is selected from a saturated or unsaturated mono- or dicarboxylic acid amide, a lactam, an acid imide or a derivative of an acid imide, an oxime, an aliphatic or aromatic or least bivalent alcohol, a polyalkylene glycol or a carbamic acid ester.

7. Holographic film material according to claim 6, wherein the water-soluble compound employed is frustose, lactose, sorbitol, sucrose or acetamide.

8. A method of preparing a hologram which comprises holographically exposing holographic film material which comprises, coated on a light transparent base, at least one light-sensitive gelatine silver halide emulsion layer the silver halide grains of which have a median grain size of less than 0.1 μm there being present in the emulsion layer from 0.1 to 1.0 g of a water-soluble compound per gram of silver present in the emulsion, the water-soluble compound being a compound which (1) does not affect the photographic properties of silver halide emulsion, (2) which is non-light scattering and (3) can be leached out from the emulsion layer during processing of the exposed holographic film material, developing the exposed silver halide using a silver halide developing solution and using a rehalogenating bleach both to remove the developed silver and redistribute it.

9. Hologram when prepared by the method of claim 8.

* * * * *